United States Patent
Baisley (10) Patent No.: US 8,024,371 B2
(45) Date of Patent: Sep. 20, 2011

(54) MANAGING INVERSE REFERENCES BETWEEN OBJECTS IN OBJECT-ORIENTED SOFTWARE

(75) Inventor: Donald Edward Baisley, Kirkland, WA (US)

(73) Assignee: Microsoft Corporation, Redmond, WA (US)

( * ) Notice: Subject to any disclaimer, the term of this patent is extended or adjusted under 35 U.S.C. 154(b) by 496 days.

(21) Appl. No.: 12/334,292

(22) Filed: Dec. 12, 2008

(65) Prior Publication Data

US 2010/0153460 A1 Jun. 17, 2010

(51) Int. Cl.
*G06F 17/30* (2006.01)
*G06F 7/00* (2006.01)

(52) U.S. Cl. ........................................ 707/802; 707/812
(58) Field of Classification Search .................. 707/802, 707/803, 809, 812, 814
See application file for complete search history.

(56) References Cited

U.S. PATENT DOCUMENTS

| | | | |
|---|---|---|---|
| 6,182,107 B1 | 1/2001 | Atsatt | |
| 6,230,213 B1 | 5/2001 | Davidson | |
| 6,366,932 B1 | 4/2002 | Christenson | |
| 6,401,100 B1 | 6/2002 | Gladieux | |
| 6,412,020 B1 | 6/2002 | Leach et al. | |
| 7,237,237 B2 | 6/2007 | Foti | |
| 7,805,467 B2 * | 9/2010 | Moir et al. | 707/814 |
| 2006/0123023 A1 | 6/2006 | Manolov | |
| 2009/0125879 A1 * | 5/2009 | Miloushev et al. | 717/108 |

OTHER PUBLICATIONS

Brian Demsky and Martin Rinard, Role-Based Exploration of Object-Oriented Programs, http://cag.csail.mit.edu/~bdemsky/app/icse02.pdf, Copyright 2001, 12 Pages.
H. V. Jagadish and Xiaolei Qian, Integrity Maintenance in an Object-Oriented Database, http://www.sigmod.org/vldb/conf/1992/P469.PDF, 1992, 12 Pages.

* cited by examiner

*Primary Examiner* — Charles Rones
*Assistant Examiner* — Fariborz Khoshnoodi
(74) *Attorney, Agent, or Firm* — Workman Nydegger (57) ABSTRACT

Managing inverse references across binary relationships. This functionality may be accomplished by using a base class with functionality for linking objects from both sides of a binary relationship. In particular, some embodiments implement a generalized inverse management capability. In some embodiments, by using a common base class for objects involved in one-to-one, one-to-many and many-to-many relationships, and by defining a field of one generic type when referring to at most one object, and by defining a field of another generic type when referring to many objects, automatic inverse management is obtained. Further, a specialization of the generic type of field used to refer to at most one object is used in cases of dependent relationships such that deletion of the reference without replacing it results in automatic disconnection of an object across all relationships.

20 Claims, 6 Drawing Sheets

MANAGING INVERSE REFERENCES BETWEEN OBJECTS IN OBJECT-ORIENTED SOFTWARE

BACKGROUND

Background and Relevant Art

Computers and computing systems have affected nearly every aspect of modern living. Computers are generally involved in work, recreation, healthcare, transportation, entertainment, household management, etc.

Complex object structures used in object-oriented software often involve the need to traverse binary relationships in both directions. Relationships can be one-to-one, one-to-many and many-to-many. Keeping inverse references correct as references are added and changed is complex and error prone, and is particularly so when disconnecting objects from complex structures that involve many kinds of references.

The subject matter claimed herein is not limited to embodiments that solve any disadvantages or that operate only in environments such as those described above. Rather, this background is only provided to illustrate one exemplary technology area where some embodiments described herein may be practiced.

BRIEF SUMMARY

Some embodiments disclosed herein include functionality for managing inverse references of binary relationships. This functionality may be accomplished by using a base class with functionality for linking inverse objects. In particular, some embodiments implement a generalized inverse management capability. In some embodiments, by using a common base class for objects involved in one-to-one, one-to-many and many-to-many relationships, and by defining a field of one generic type when referring to at most one object, and by defining a field of another generic type when referring to many objects, automatic inverse management is obtained by automatic inverse references being made. Further, a specialization of the generic type of field used to refer to at most one object is used in cases of dependent relationships such that deletion of the reference without replacing it results in automatic disconnection of an object across all relationships.

This Summary is provided to introduce a selection of concepts in a simplified form that are further described below in the Detailed Description. This Summary is not intended to identify key features or essential features of the claimed subject matter, nor is it intended to be used as an aid in determining the scope of the claimed subject matter.

Additional features and advantages will be set forth in the description which follows, and in part will be obvious from the description, or may be learned by the practice of the teachings herein. Features and advantages of the invention may be realized and obtained by means of the instruments and combinations particularly pointed out in the appended claims. Features of the present invention will become more fully apparent from the following description and appended claims, or may be learned by the practice of the invention as set forth hereinafter.

BRIEF DESCRIPTION OF THE DRAWINGS

In order to describe the manner in which the above-recited and other advantages and features can be obtained, a more particular description of the subject matter briefly described above will be rendered by reference to specific embodiments which are illustrated in the appended drawings. Understanding that these drawings depict only typical embodiments and are not therefore to be considered to be limiting in scope, embodiments will be described and explained with additional specificity and detail through the use of the accompanying drawings in which.

DETAILED DESCRIPTION

Some embodiments disclosed herein include functionality for managing relationships for inverses. This functionality may be accomplished by using a base class with functionality for managing references between objects such that causing a first object to refer to a second object automatically causes there to be an inverse reference from the second object referring to the first object. Additionally, the base class may include functionality for disconnecting inverse references such that removing a reference from a first object to a second object automatically causes an inverse reference to the first object to be removed from the second object.

In particular, some embodiments implement a generalized inverse management capability for object-oriented languages like C#. Such a capability may be implemented to work on objects alone, without any tie to an object-to-relational or object-to-database mapping. Additionally, some embodiments may include functionality for maintaining referential integrity between objects, supporting the language's normal use of collections, and/or supporting dependent relationships where disconnecting an object from one relationship causes it to be disconnected from all others. Such a capability can simplify development of complex object-oriented software.

In some embodiments, by using a common base class for objects involved in one-to-one, one-to-many and many-to-many relationships, and by defining a field of one generic type when referring to at most one object, and by defining a field of another generic type when referring to many objects, automatic inverse management is obtained. Further, a specialization of the generic type of field used to refer to at most one object is used in cases of dependent relationships such that deletion of the reference without replacing it results in automatic disconnection of an object across all relationships. Inverse management between objects may be handled using generic classes that encapsulate support of one-to-one, one-to-many and many-to-many relationships. Dependent relationships can be supported such that making a single disconnection of an object can automatically cause it to be fully disconnected in all its relationships, which can then automatically cause further cascading or iterative disconnections. Embodiments may support reflective relationships for which inverses are managed (where a relationship is symmetric as in a "spouse" relationship or a "sibling" relationship). A novel approach of an implementation of one embodiment is that it uses reflection in order to manage inverses generically.

Figure 1:
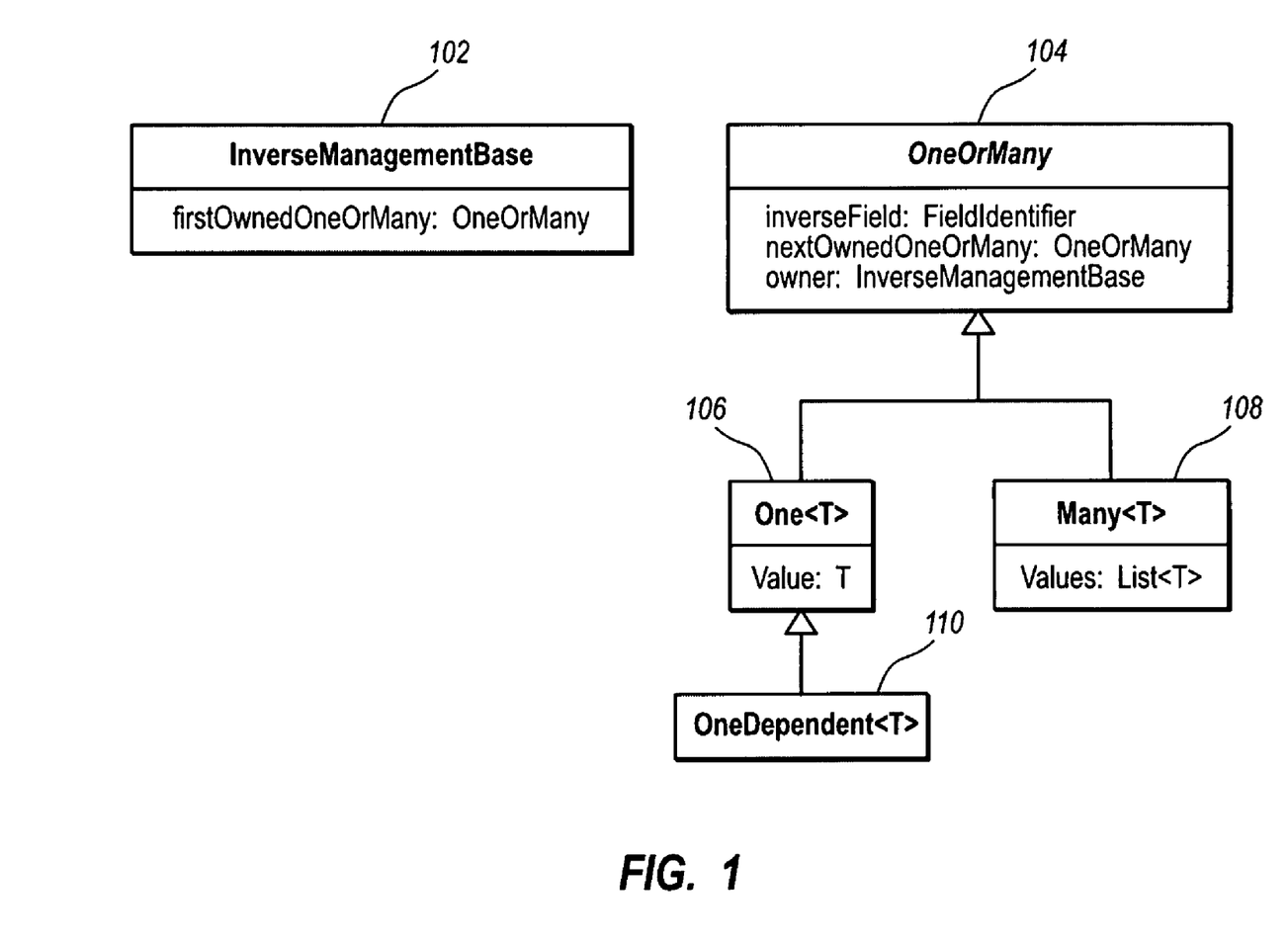
FIG. 1 illustrates a class structure of some example embodiments.

A specific example is now illustrated with reference to FIG. 1. The example illustrated shows names of classes used in the particular illustration, but it should be understood that such names are merely for illustration. Other names and other functionality may be imparted to classes within the scope of the embodiments claimed herein.

Embodiments may use a single base class 102 from which the classes of all objects whose inverses are managed derive. In the examples illustrated herein, InverseManagementBase is a base class 102 of all classes of objects involved in relationships managed by some embodiments illustrated. The class has a public operation, named in this example, DisconnectAll. The public operation disconnects an object from all relationships for which inverse management is performed, in which it is involved.

Embodiments may use a base class 104, which is specialized by generic classes 106 and 108 to manage references to inverses. A generic class 106 is used to manage a single reference to an object. In the present example, this generic class is named One<T>. One<T> is a generic class given as the type of any number of instance fields in any class specializing InverseManagementBase. Each of the fields is initialized to an instance of One<T>, which manages a single reference from the object having the field to an object of type T. Type T also specializes InverseManagementBase. One<T> has a property, Value, of type T supporting both "get" and "set" access.

In examples illustrated herein, OneDependent<T> is a generic class 110 which specializes One<T>. An instance of OneDependent<T> is used in place of an instance of One<T> in cases where it is desirable to implement functionality where replacing a reference to an object with null or some equivalent causes the entire referring object to be disconnected from all objects. In particular, replacing a reference to an object with null may result in the DisconnectAll function being called Examples illustrated herein further include Many<T>, which is a generic class 108 given as the type of any number of instance fields in any class specializing InverseManagementBase. The field is initialized to an instance of Many<T>, which manages a plurality of references from the object having the field to objects of type T. Type T also specializes InverseManagementBase. Many<T> may implement normal collection processing interfaces, such as C#'s ICollection and IList.

The constructors for One<T>, OneDependent<T> and Many<T> all take a single argument of type string whose value is the name of the field that is the inverse end of the same binary relationship.

Using the specific examples above, general actions can be performed as follows:
1. Construction of one or more objects that are instances of classes that specialize InverseManagementBase.
2. For any field of type One<T> in a first object, setting the Value of the field's One<T> to refer to a second object. The following results are obtained:
    a. If the One<T>'s Value had referred to a third object that is not the second object, then access to the One<T>'s inverse field in the third object no longer reveals the first object, and if the inverse field is a One<T>, then that field in the third object is set to null, giving results described in 4 below.
    b. Access to the One<T>'s inverse field in the second object then reveals the first object, as one Value in the case that the inverse field is a One<T>, and otherwise, as one of a collection in the case where the inverse field is a Many<T>.
    c. If the inverse field in the second object is a One<T> that previously referred to a fourth object that is not the first object, then the One<T> field in that fourth object is set to null, giving results described in 4 below.
3. For any field of type Many<T> in a first object, adding a second object to the field's Many<T>. The following results are obtained:
    a. Access to the Many<T>'s inverse field in the second object then reveals the first object, as one Value in the case that the inverse is a One<T>, and otherwise as one of a collection in the case where the inverse field is a Many<T>.
    b. If the inverse field in the second object is a One<T> that previously referred to a third object that is not the first object, then the One<T> field in that third object is set to null, giving results described in 4 below.
4. For any field of type One<T> in a first object, setting the Value of the field's One<T> to null. If the Value previously referred to a second object the following results are obtained:
    a. The inverse field in the second object no longer reveals the first object. If the inverse field in the second object is a One<T>, then the One<T> field in that second object is set to null, giving results described in this step 4 for that second object.
    b. If the One<T> field in the first object holds a OneDependent<T>, then DisconnectAll is automatically called on the first object.
5. For any field of type Many<T> in a first object, removing a second object from the field's Many<T>. The following results are obtained:
    a. Access to the Many<T>'s inverse field in the second object no longer reveals the first object.
    b. If the inverse field in the second object is a One<T>, then the One<T> field in that second object is set to null, giving results described in 4 above.
6. For any first object, calling DisconnectAll. The following results are obtained:
    a. For each field of type One<T> in the first object, the Value of the field's One<T> is set to null, giving results described in 4 above.
    b. For each field of type Many<T> in the first object, each object in the Many<T> is removed from the Many<T>, giving the results described in 5 above.

An illustrative example is now given. The following define various classes the specialize InverseManagentBase base class 102.

```
class Department : InverseManagementBase
{
  public Many<OfferedPosition> positions = new
  Many<OfferedPosition>("department");
  public One<Person> departmentHead = new
  One<Person>("supervisedDepartment");
}
class OfferedPosition : InverseManagementBase
{
  public One<Department> department = new
  OneDependent<Department>("positions");
  public Many<Person> candidates = new
  Many<Person>("positionsAppliedFor");
}
class Person : InverseManagementBase
{
  public Many<OfferedPosition> positionsAppliedFor = new
  Many<OfferedPosition>("candidates");
  public One<Department> supervisedDepartment = new
```

```
        One<Department>("departmentHead");
    }
```

The example shows three kinds of binary relationships. First, the example illustrates a one-to-many relationship between the classes Department and OfferedPosition. Department.positions is the inverse of OfferedPosition.department.

Second, the example illustrates a many-to-many relationship between the classes OfferedPosition and Person. OfferedPosition.candidates is the inverse of Person.positionsAppliedFor.

Third, the example illustrates a one-to-one relationship between the classes Department and Person. Department.departmentHead is the inverse of Person.supervisedDepartment. In this example, a Person can supervise at most one Department.

The example further illustrates a dependent relationship in that OfferedPosition.department is dependent meaning that if OfferedPosition.department becomes null after being connected to a Department, the OfferedPosition object will be automatically disconnected from everything by invocation of the DisconnectAll function—in this case, from its candidates.

A field can be its own inverse, as in the following example (which assumes monogamy).

```
    class Person : InverseManagementBase
    {
        public Many<Person> siblings = new Many<Person>("siblings");
        public One<Person> spouse = new One<Person>("spouse");
    }
```

Figure 2A:
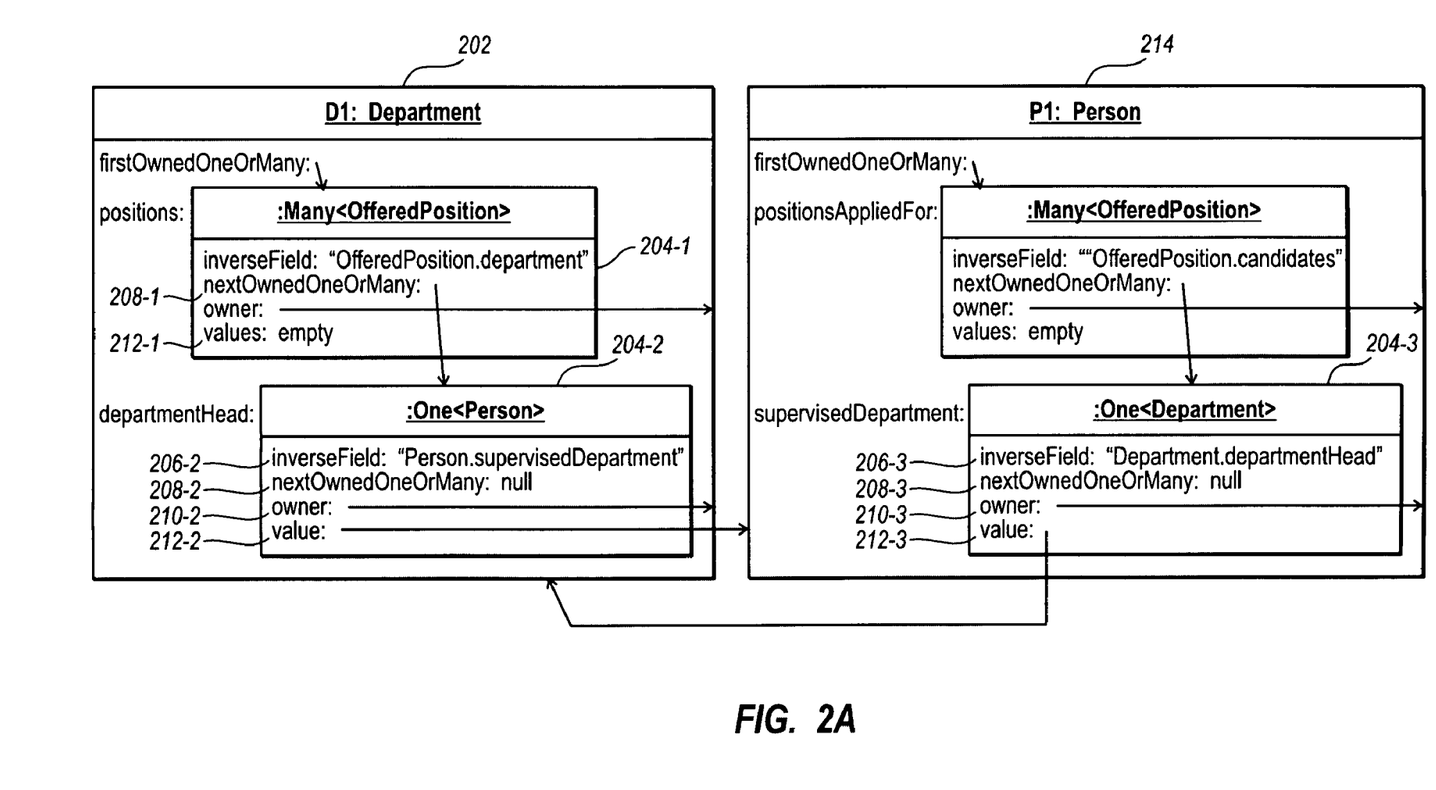
FIG. 2A illustrates a static structure of objects with one-to-one relationships for which inverses are managed.

A generalized example of some of the relationships defined above is now illustrated with reference to FIG. 2A. The example illustrated in FIG. 2A is an example where object inverse management is accomplished using instance fields where both instance fields that define corresponding inverses are of a type which manage a single inverse reference from one object to another. FIG. 2A illustrates objects that may be stored in one or more physical computer readable media in a computing environment. Additionally reference is made jointly to FIG. 3, which illustrates a method 300 for managing relationships for inverses of objects. The method 300 may include accessing a first object (act 302). In this example, the first object is object D1 referenced at 202. The first object D1 is an instance of a first type, Department. The first type Department specializes a base class 102 (illustrated in FIG. 1). The base class 102 includes functionality for linking inverse object references. The first object 202 comprises one or more instance fields. The one or more instance fields hold objects, referenced generally as 204, which are linked together in a linked list. The one or more instance field objects 204 include a first instance field object 204-2 which is an object of a type which manages a single reference, along with its inverse, from any object of the base class to another object of the base class. For example, the first instance field object 204-2 may be of type One<T> 106 illustrated in FIG. 1. In this example, the argument T is to the Person class.

The first instance field object 204-2 includes an inverse field identifier field 206-2, which holds an identification of a field in a second type specializing the base class. In the example illustrated, the first instance field object's inverse field identifier field 206-2 holds an identification of a supervisedDepartment field in the Person type, where the Person type specialized the base class 102 InverseManagementBase.

The first instance field object 204-2 further includes a next instance field object field 208-2, which includes a pointer to a next instance field object in the first object. The pointer to the next instance field object is null if there are no more instance field objects in the linked list of the first object. In the example illustrated, there are no more instance field objects 204 after the first instance field object, thus the next instance field object field 208-2 holds a null. An example of a pointer is illustrated at the next instance field object field 208-1 which holds a pointer to the first instance field object 204-2.

The first instance field object 204-2 includes an owner field 210-2 including a pointer to an owning object of the first instance field object 204-2. In the example illustrated, the owner of the first instance field object 204-2 is the first object D1 202, which is the object that has the departmentHead field containing the first instance field object 204-2.

The first instance field object 204-2 includes a value field 212-2. In the present example where the instance field object 204-2 is of a type that manages a single reference (e.g. of type One<T> in the present example), the value field includes a single pointer to one other object, itself or null. In the example illustrated, the value field 212-2 includes a reference to a second object.

Figure 3:
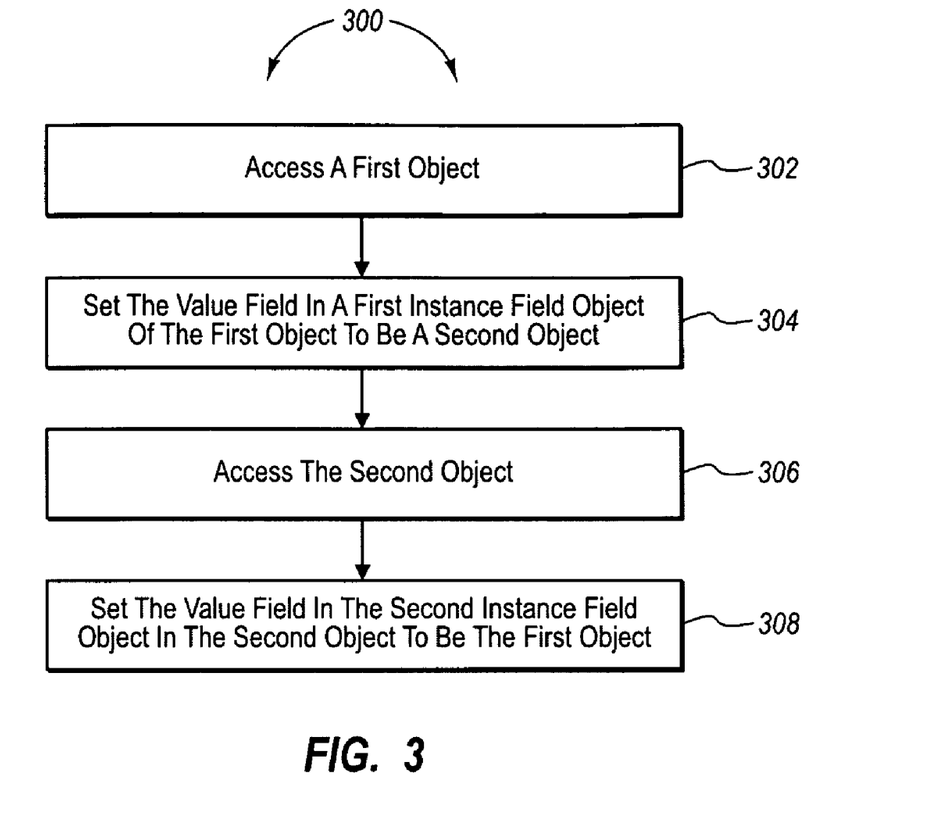
FIG. 3 illustrates a method of managing relationships for inverses.

The method 300 may include setting the value field in the first instance field object to point to a second object (act 304). This may be performed by receiving user input setting the value field in the first instance field object to point to a second object. The second object is an instance of the second type. In the example illustrated in FIG. 2A, the second object is object P1 214, which is of type Person.

The method may further include accessing the second object 214 (act 306). In some embodiments, this may be done automatically, without user input, as a result of the user input setting the value field in the first instance field object to point to a second object. The second object includes one or more instance fields. The one or more instance fields 204 hold objects which are linked together in a linked list. The one or more instance field objects include a second instance field object 204-3 which is an object of a type which manages a single reference along with its inverse from any object of the base class to another object of the base class. E.g. the second instance field object 204-3 is of type One<T> or OneDependent<T>. The second instance field object includes an inverse field identifier field 206-3 holding an identification of a field in the first type. E.g. The second inverse field identifier field 206-3 holds an identification of the field departmenthead in the type Department, where the type Department specialized the base class 102 InverseManagementBase. The second instance field object 204-3 further includes a next instance field object field 208-3 including a pointer to a next instance field object in the second object. The pointer to the next instance field object is null if there are no more instance field objects in the linked list of the second object. Such is the case illustrated at 208-3. The second instance field object 204-3 further includes an owner field 210-3 including a pointer to an owning object of the second instance field object 204-3. The owner of the second instance field object 204-3 is the second object 214. The second instance field object 204-3 further includes a value field 212-3 including a single pointer to one other object, itself or null. In the example illustrated, the value field 212-3 includes a pointer to the first object 202. To accomplish this, the method may include setting the value field 212-3 in the second instance field object to be the first object (act 308), thereby linking the first instance field object 204-2 to the second instance field object 204-3 as inverses of one another. This may be performed automatically as a result of the user input setting the value field in the first instance field object to point to a second object, using the inverse management capabilities of the base class. This may be done, for example, by using reflection as is described in more detail later herein.

In some embodiments, identification of a field in a second type comprises a string whose value is the name of the field in the second type, and the identification of a field in the first type comprises a string whose value is the name of the field in the first type. For example, the inverse field 206-2 includes a string "supervisedDepartrnent" and the inverse field 206-3 includes a string "departmentHead."

The method 300 may further include accessing the first instance field object 204-2 to reveal the second instance field object 204-3

The method 300 may further include invoking a disconnect all function on the first object 202. The disconnect all function is a public operation of the base class 102 (FIG. 1). The disconnect all function disconnects an object from all relationships for which inverses are managed in which it is involved by: for any instance field objects that are of a type which manage a single reference with its inverse, setting any pointers in the value fields to null; and for any instance field objects that are of a type which manage a plurality of references with their inverses, removing pointers to objects in the values field. For example, if a disconnect all function were called on D1, then the pointer in the value field 212-2 would be set to null, and any pointer in the value field 212-1 would be removed. In the present example, no pointers exist in the value field 212-1, and as such the example is trivial, but will be more fully illustrated in subsequent discussions herein. Setting the value field 212-2 to null then automatically causes its inverse reference at 212-3 to be set to null.

Figure 2B:
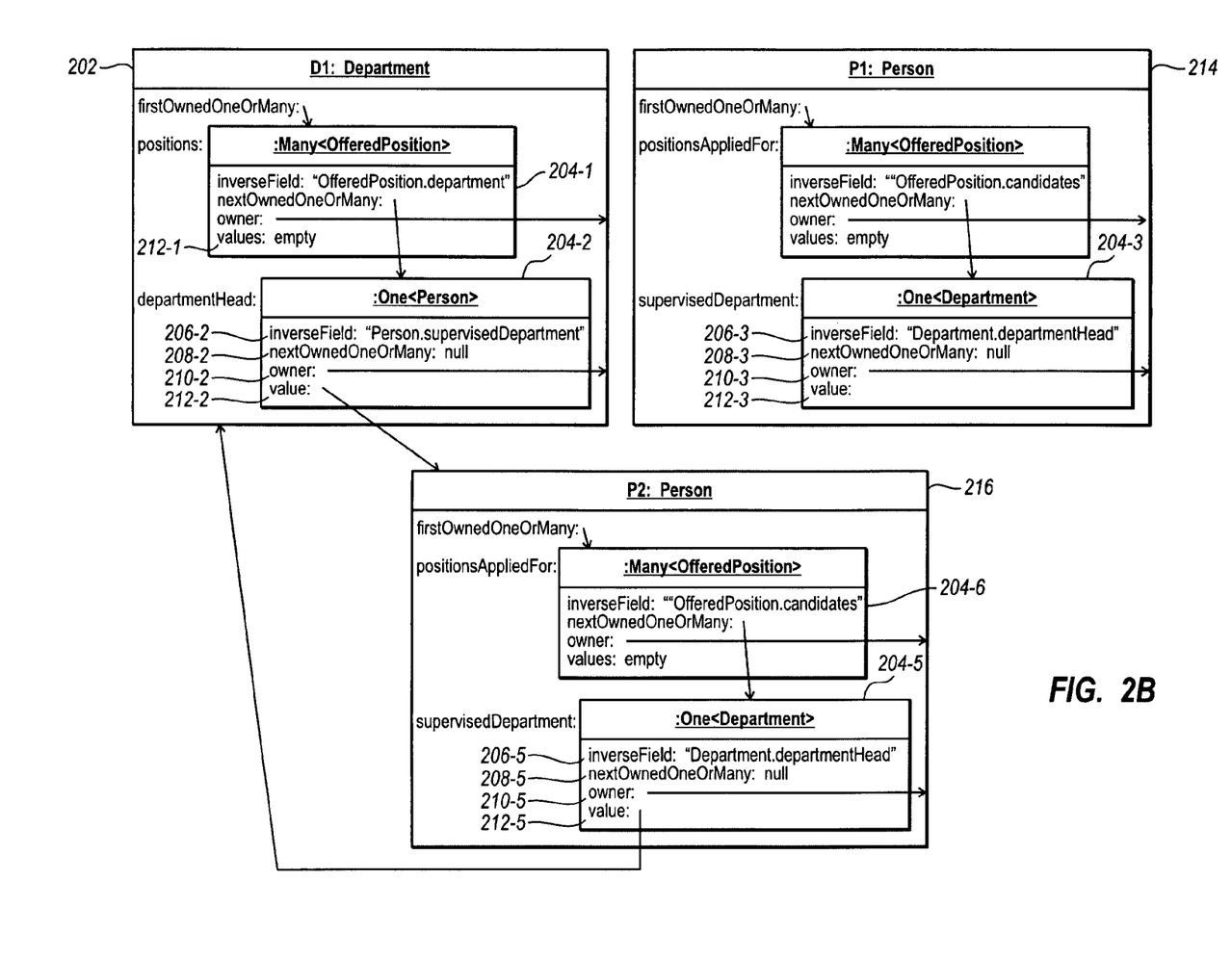
FIG. 2B illustrates another example of a static structure of objects with one-to-one relationships for which inverses are managed.

The method 300 may be performed where setting the value field 212-2 in the first instance field object 204-2 to be a second object 214 includes changing a pointer in the value field 212-2 in the first instance field object 204-2 from a pointer to a third object (in this example P2 216 illustrated in FIG. 2B). The third object 216 specializes the base class 102. The third object includes a third instance field object 204-5. The third instance field object 204-5 includes an inverse field identifier field 206-5 holding an identification of a field in the first type Department. The third instance field object 204-5 includes a next instance field object field 208-5 including a pointer to a next instance field object in the third object 216. The pointer to the next instance field object is null if there are no more instance field objects in the linked list of the third object. The third instance field object 204-5 includes an owner field 210-5 including a pointer to an owning object of the third instance field object 204-5. The owner of the third instance field object 204-5 is the third object 216. The third instance field object 204-5 includes a value field 212-5 including a pointer to the first object 202. As a result of changing a pointer in the value field 212-2 in the first instance field object 204-2 from a pointer to a third object 216: if the third instance field object 204-5 is of a type which manages a single reference with its inverse (which is true in the present example as the third instance field object 204-5 is of type One<Department>) the method includes changing the value field 212-5, which holds a pointer to the first object, to null. Illustratively, performing these actions would cause the state illustrated FIG. 2B to transitions to the state shown in FIG. 2A, and would result in the field 212-5 holding a null reference.

As noted, some embodiments may make use of a dependent type. For example, if the first instance field object 204-2 were of a dependent type (e.g. OneDependent<Person>), then replacing a pointer in the value field 212-2 with null causes the first object 202 to be disconnected from all relationships for which inverses are managed in which it is involved. Thus, for any instance field objects owned by the object being disconnected that are of a type which manages a single reference with its inverse (e.g. One<Person>), setting any pointers in the value fields to null and for any instance field objects that are of a type which manage a plurality of inverse references (e.g. Many<OfferedPostion>) removing pointers to objects in the values field. This may cause a cascading disconnect of one or more of the objects pointed to in value or values fields of instance field objects in the first object. Each removal of a reference in a value or values field in an instance field object owned by the first object causes an inverse reference, which points back to the first object, that occurs in an instance field object of the referenced object to be removed also. A cascading disconnect occurs where an inverse field of any instance field object owned by the first object holds an object of type OneDependent<T>, which would have had a value pointing at the first object.

Figure 2C:
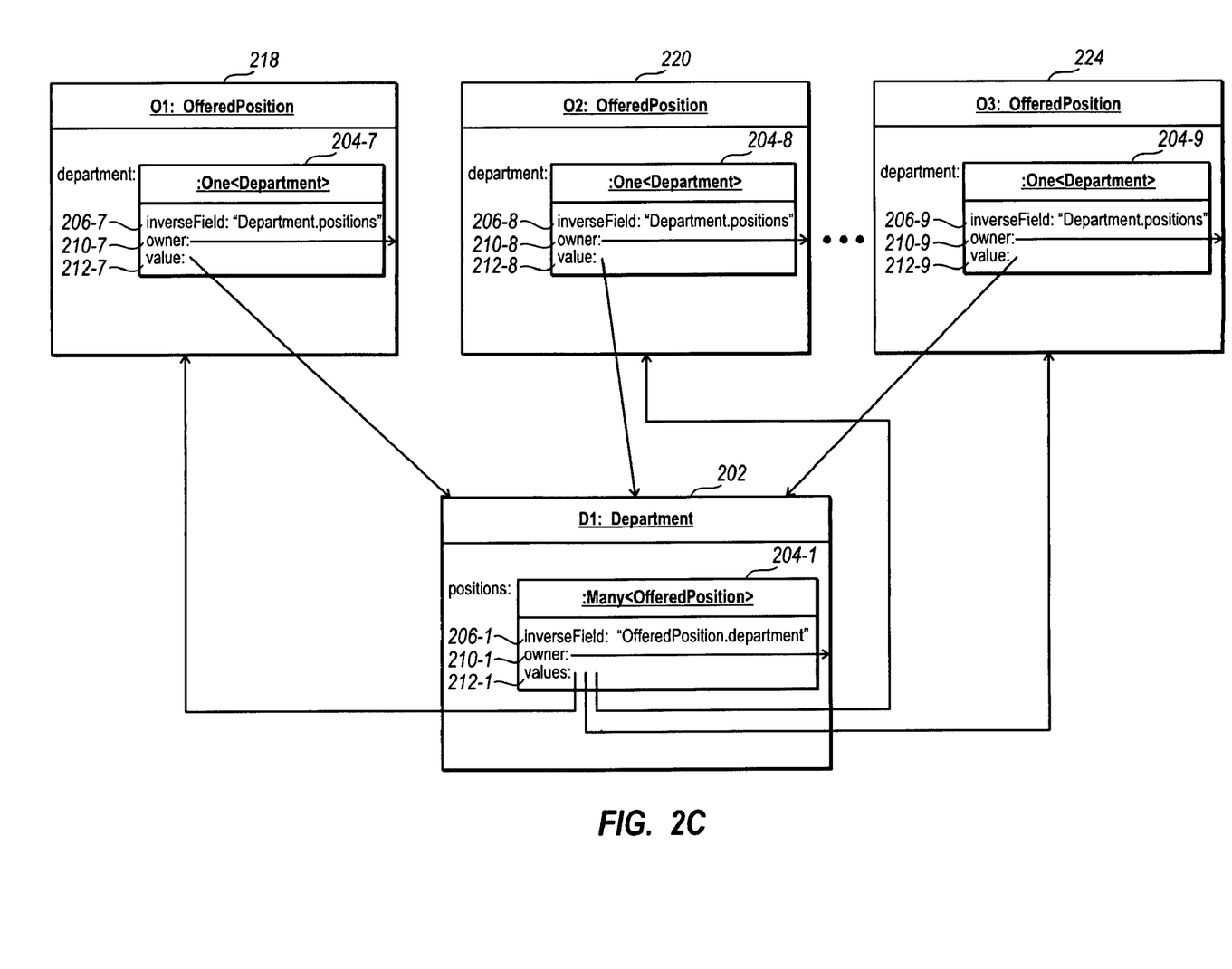
FIG. 2C illustrates a static structure of objects with a one-to-many relationships for which inverses are managed.

The example illustrated above was illustrated where a one-to-one relationship for which inverses are managed existed. However, as noted in a number of examples above, provisions have been made for one-to-many and many-to-many relationships for which inverses are managed. An abbreviated example of a one-to-many relationship for which inverses are managed is illustrated in FIG. 2C. Note that the next instance field object fields 208 have been removed, as well as the beginning pointer of the linked list, and other non-discussed instance field objects 204. While not illustrated here, those elements may nonetheless be included in various embodiments.

The example illustrated in FIG. 2C includes the object D1 202 which is of type Department which specializes the base class 102. The object D1 202 includes a first instance field object 204-1. The first instance field object 204-1 includes an inverse field identifier field holding an identification of a field in a second type specializing the base class. In this example, the inverse field identifier field 206-1 identifies the field OfferedPosition.department as the inverse field, which is the field called department in the type OfferedPosition.

The first instance field object 204-1 includes a next instance field object field (not shown) including a pointer to a next instance field object in the first object. The pointer to the next instance field object is null if there are no more instance field objects in the linked list of the first object.

The first instance field object 204-1 includes an owner field 210-1 including a pointer to an owning object of the first instance field object 204-1. The owner of the first instance field object is the first object 202.

Because the first instance field object 204-1 is of type Many<OfferedPosition>the first instance field object 204-1 includes a values field 212-1 that can include zero or more pointers to objects rather than just a single pointer. In the example illustrated, the first instance field object 204-1 includes pointers to objects 01, 02, and 03 which are 218, 220 and 224 respectively.

The objects 218, 220 and 224 each include a department instance field object 204-7, 204-8, 204-9 respectively, that is of type One<Department>. Each of the instance fields objects 204-7, 204-8 and 204-9 includes an inverse field identifier field 206-7, 206-8 and 206-9 respectively that indentifies the instance field in the type Department for holding instance field objects whose value or values are inverse references. Each of the instance fields objects 204-7, 204-8 and 204-9 includes an owner field, 210-7, 210-8 and 210-9 respectively, with a pointer identifying its owner object, 218, 220 and 224 respectively. Each of the instance fields objects 204-7, 204-8 and 204-9 includes a value field, 212-7, 212-8 and 212-7, which includes a pointer to the first object 202. The pointers in the value fields 212-7, 212-8 and 212-9 and the pointers in the value field 212-1 create a many-to-one relationship for which inverses are managed between the objects 218, 220, and 224; and object 202.

Figure 2D:
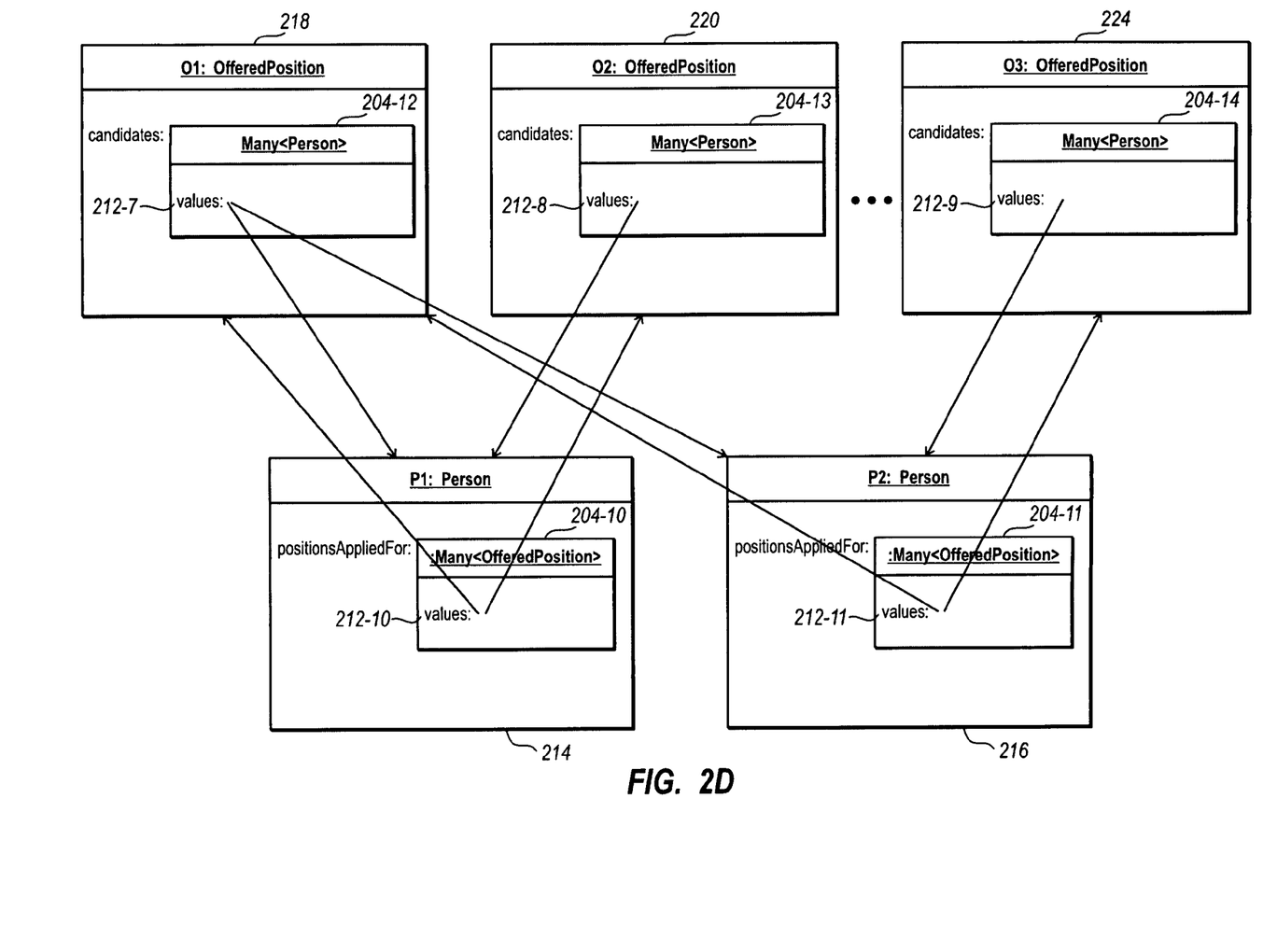
FIG. 2D illustrates a static structure of objects with many-to-many relationships for which inverses are managed.

A similar analysis could be undertaken for the many-to-many relationships for which inverses are managed analysis. For completeness with simplicity, an example is shown in FIG. 2D which illustrates the pointers in values fields 212 for instance field objects 204 that are of type Many<T> in a many-to-many relationship. FIG. 3C illustrates the object 214 includes an instance field object 204-10 with a values field 212-10 that points to objects 218 and 220. The object 216 includes an instance field object 204-11 with a values field 212-11 that points to objects 218 and 224. The object 218 includes an instance field object 204-12 with a values field 212-7 that points to objects 214 and 216. The object 220 includes an instance field object 204-13 with a values field 212-8 that points to object 214. The object 224 includes an instance field object 204-14 with a value field 212-9 that points to object 216. The pointers being set in the values fields 212 of the instance field objects 204 of the objects 214-224 link the instance field objects 204-12, 204-13 and 204-14 and the instance field objects 204-10 and 204-11 in a many-to-many relationship for which inverses are managed. The pointers in values fields occur in pairs such that inverse references are maintained. OfferedPosition.candidates and Person.positionsAppliedFor are two ends of the same binary relationship. When that relationship is established by adding a pointer to the values field of a Many<OfferedPosition> object in the positionsAppliedFor field of a Person object, an inverse pointer is automatically added to values field of the Many<Person> object in the candidates field of the referenced OfferedPosition object. In this way, all binary relationships are accessible from either end.

While other approaches to managing inverse references for binary relationships are tied to use of a database, such as cases where there is an object-oriented access to a relational store, embodiments herein can be independent of any such data store and can be used in cases where tying to a data store or the overhead of a relational mapping is undesirable. Also, it is typical for implementation using a database to update inverses upon committing a transaction to a database. Embodiments described herein can be advantageously utilized to update inverses immediately as references are added or changed.

Additional details are now presented. Each One<T> and each Many<T> is in a field of an owning object that is indirectly of type InverseManagementBase. Each One<T> and each Many<T> internally refers to its owning object and is accessible by the owning object. One approach used to maintain that accessibility is for the constructor of an InverseManagementBase to use reflection to find all of its fields that are of type One<T> and Many<T>, get the values of these fields and then link them into a list for later reference while setting each One<T>'s and Many<T>'s reference to the owning object being constructed. The reference to the owning object is used when managing inverses to determine what values in an inverse One<T> or Many<T> refer to the owner. The linked list can then be used when it is desirable to access all of the One<T> and Many<T> fields of an object, as is done in step 6 above.

Also, each One<T> 0and each Many<T> privately refers to its inverse field, which is also of type One<T> or Many<T>. One approach for maintaining a reference to the inverse field is for the constructor of a One<T> and of a Many<T> to use reflection and the inverse field's name (given as a constructor argument) to find the field, and then save a reference to the field. Once there is a reference to the inverse field, it is a simple matter for the One<T> or Many<T> to access the inverse field in order to add or delete references to objects as described above.

Embodiments of the present invention may comprise or utilize a special purpose or general-purpose computer including computer hardware, as discussed in greater detail below. Embodiments within the scope of the present invention also include physical and other computer-readable media for carrying or storing computer-executable instructions and/or data structures. Such computer-readable media can be any available media that can be accessed by a general purpose or special purpose computer system. Computer-readable media that store computer-executable instructions are physical storage media. Computer-readable media that carry computer-executable instructions are transmission media. Thus, by way of example, and not limitation, embodiments of the invention can comprise at least two distinctly different kinds of computer-readable media: physical storage media and transmission media.

Physical storage media includes RAM, ROM, EEPROM, CD-ROM or other optical disk storage, magnetic disk storage or other magnetic storage devices, or any other medium which can be used to store desired program code means in the form of computer-executable instructions or data structures and which can be accessed by a general purpose or special purpose computer.

A "network" is defined as one or more data links that enable the transport of electronic data between computer systems and/or modules and/or other electronic devices. When information is transferred or provided over a network or another communications connection (either hardwired, wireless, or a combination of hardwired or wireless) to a computer, the computer properly views the connection as a transmission medium. Transmissions media can include a network and/or data links which can be used to carry or desired program code means in the form of computer-executable instructions or data structures and which can be accessed by a general purpose or special purpose computer. Combinations of the above should also be included within the scope of computer-readable media.

Further, upon reaching various computer system components, program code means in the form of computer-executable instructions or data structures can be transferred automatically from transmission media to physical storage media (or vice versa). For example, computer-executable instructions or data structures received over a network or data link can be buffered in RAM within a network interface module (e.g., a "NIC"), and then eventually transferred to computer system RAM and/or to less volatile physical storage media at a computer system. Thus, it should be understood that physical storage media can be included in computer system components that also (or even primarily) utilize transmission media.

Computer-executable instructions comprise, for example, instructions and data which cause a general purpose computer, special purpose computer, or special purpose processing device to perform a certain function or group of functions. The computer executable instructions may be, for example, binaries, intermediate format instructions such as assembly language, or even source code. Although the subject matter has been described in language specific to structural features and/or methodological acts, it is to be understood that the subject matter defined in the appended claims is not necessarily limited to the described features or acts described above. Rather, the described features and acts are disclosed as example forms of implementing the claims.

Those skilled in the art will appreciate that the invention may be practiced in network computing environments with many types of computer system configurations, including, personal computers, desktop computers, laptop computers, message processors, hand-held devices, multi-processor systems, microprocessor-based or programmable consumer electronics, network PCs, minicomputers, mainframe computers, mobile telephones, PDAs, pagers, routers, switches, and the like. The invention may also be practiced in distributed system environments where local and remote computer systems, which are linked (either by hardwired data links, wireless data links, or by a combination of hardwired and wireless data links) through a network, both perform tasks. In a distributed system environment, program modules may be located in both local and remote memory storage devices.

The present invention may be embodied in other specific forms without departing from its spirit or essential characteristics. The described embodiments are to be considered in all respects only as illustrative and not restrictive. The scope of the invention is, therefore, indicated by the appended claims rather than by the foregoing description. All changes which come within the meaning and range of equivalency of the claims are to be embraced within their scope.

What is claimed is:

1. In a computing environment, a method for managing relationships of objects using references for which inverses are managed, the method comprising:
   accessing a first object, wherein the first object is an instance of a first type that specializes a base class, the base class including functionality for linking inverse object references, wherein the first object comprises one or more instance fields, the one or more instance fields holding objects including a first instance field object which is an object of a type which manages a single reference and the single reference's inverse from any object of the base class to an object of the base class, wherein the first instance field object comprises a value field holding a single pointer to one other object, the first instance object or null;
   receiving user input setting the value field in the first instance field object to a second object, wherein the second object is an instance of a second type, the second type specializing the base class;
   accessing the second object, wherein the second object comprises one or more instance fields, the one or more instance fields holding objects, the one or more instance field objects including a second instance field object which is an object of a type which manages a single reference from any object of the base class to another object of the base class, wherein the second instance field object comprises a value field holding a single pointer to one other object, the second instance object or null;
   automatically, without user input, and as a result of setting the value field in the first instance field object to a second object, setting the value field in the second instance field object to the first object; and
   thereby linking the first instance field object to the second instance field object as inverses of one another.

2. The method of claim 1, further comprising accessing the first instance field object to reveal the second object.

3. The method of claim 1, further comprising invoking a disconnect all function on the first object, wherein the disconnect all function is a public operation of the base class, and wherein the disconnect all function disconnects an object from all relationships in which the object is involved for which inverses are managed, disconnecting comprising:
   for any instance field objects that are of a type which manage a single inverse reference, setting any pointers in the value fields to null;
   for any instance field objects that are of a type which manage a plurality of references, removing all pointers to objects in the values field; and
   for any inverse instance fields of all instance fields in the first object, performing at least one of setting any pointers to the first object to null for instance field objects that are of a type which manage a single inverse reference or removing all pointers to the first object for any instance field objects that are of a type which manages a plurality of references.

4. The method of claim 1, wherein setting the value field in the first instance field object to a second object, comprises changing a pointer in the value field in the first instance field object from a pointer to a third object, the third object specializing the base class, wherein the third object comprises a third instance field object, the third instance field object comprising a value field including a pointer to the first object and as a result of changing a pointer in the value field in the first instance field object from a pointer to a third object:
   when the third instance field object is of a type which manages a single inverse reference, setting the value field in the third instance field object to null; else
   when the third instance field object is of a type which manages a plurality of references, removing the pointer to the first object from the values field.

5. The method of claim 1, wherein the first instance field object is of a dependent type, such that replacing a pointer in the value field with null causes the first object to disconnected from all relationships in which the first object is involved for which inverses are managed, disconnecting comprising:
   for any instance field objects that are of a type which manages a single reference, setting any pointers in the value fields to null and
   for any instance field objects that are of a type which manage a plurality of references, removing pointers to objects in the values field.

6. The method of claim 5, wherein disconnecting from all objects pointed to in value fields of all instance field objects in the first object comprises removing pointers or setting pointer values to null in objects pointed to in value or values fields of all instance field objects in the first object, which causes a cascading disconnect by one or more other objects.

7. The method of claim 1, wherein the first instance field object comprises:
   an inverse field identifier field holding an identification of a field in the second type specializing the base class, wherein the identified field is the field in the second object that holds the second instance field object;
   a next instance field object field including a pointer to a next instance field object in a field in the first object, wherein the pointer to the next instance field object is null when there are no more instance field objects in a linked list of the first object;
   an owner field including a pointer to an owning object of the first instance field object, wherein the owner of the first instance field object is the first object; and
   the second instance field object comprises:

an inverse field identifier field holding an identification of a field in the first type, wherein the identified field is the field in the first object that holds the first instance field object;

a next instance field object field including a pointer to a next instance field object in a field in the second object, wherein the pointer to the next instance field object is null when there are no more instance field objects in a linked list of the second object;

an owner field including a pointer to an owning object of the second instance field object, wherein the owner of the second instance field object is the second object.

8. The method of claim 7, wherein identification of a field in a second type comprises a string whose value is the name of the field in the second object that holds the second instance field object, and wherein the identification of a field in the first type comprises a string whose value is the name of the field in the first object that holds the first instance field object.

9. The method of claim 1, wherein the objects for which inverses are managed held in the one or more instance fields that the first object comprises are linked together in a linked list, and wherein the objects for which inverses are managed held in the one or more instance fields that the second object comprises are linked together in a linked list.

10. In a computing environment, a method for managing relationships of objects using references for which inverses are managed, the method comprising:

accessing a given number of first objects, wherein the first objects are instances of a first type that specializes a base class, the base class including functionality for linking inverse object references, wherein the first objects comprise one or more instance fields, the one or more instance fields holding objects, the one or more instance field objects each including a first instance field object which is an object of a type which manages a single reference from any object of the base class to an object of the base class, wherein each of the first instance field objects comprises a value field holding a single pointer to one other object, the first instance object or null;

receiving user input setting the value fields in the first instance field objects to a second object, wherein the second object is an instance of a second type, the second type specializing the base class;

accessing the second object, wherein the second object comprises one or more instance fields, the one or more instance fields holding objects, the one or more instance field objects including a second instance field object which is an object of a type which manages a plurality of references from any object of the base class to another object of the base class, wherein the second instance field object comprises a values field holding zero or more pointers, each pointer pointing to another object or the pointer;

automatically, without user input, and as a result of setting the value field in the first instance field object to a second object, adding a pointer to the first object into the values field in the second instance field object; and thereby linking the first instance field object to the second instance field object as inverses of one another.

11. The method of claim 10, further comprising accessing one or more of the first instance field objects to reveal the second object.

12. The method of claim 10, further comprising accessing the second instance field object to reveal the first object.

13. The method of claim 10, further comprising invoking a disconnect all function on the second object, wherein the disconnect all function is a public operation of the base class, and wherein the disconnect all function disconnects an object from all relationships in which the object is involved for which inverses are managed, disconnecting comprising:

for any instance field objects that are in fields of the second object and that are of a type which manages a single reference for which inverses are managed, setting any pointers in the value fields to null;

for any instance field objects that are in fields of the second object and that are of a type which manages a plurality of references for which inverses are managed, removing all pointers to objects in the values field; and for any inverse instance fields of all instance fields in the second object, at least one of setting any pointers to the second object to null for instance field objects that are of a type which manages a single inverse reference or removing all pointers to the second object for any instance field objects that are of a type which manages a plurality of references.

14. The method of claim 10, further comprising in addition to adding a pointer to the first object into the values field in the second instance field object to include pointers to each of the given number of first objects, removing a pointer to a third object from the values field in the second instance field object, the third object specializing the base class, wherein the third object comprises a third instance field object, the third instance field object comprising a value or values field including a pointer to the second object and as a result of removing a pointer to the third object from the value field in the second instance field object from a pointer to a third object:

when the third instance field object is of a type which manages a single inverse reference, setting a value field in the third instance field object to null; else when the third instance field object is of a type which manages a plurality of inverse references, removing the pointer to the second object from the values field.

15. The method of claim 10, wherein for each first object each of the first instance field objects comprise:

an inverse field identifier field holding an identification of a field in the second type specializing the base class, wherein the identified field is the field in the type of the second object that holds the second instance field object;

a next instance field object field including a pointer to a next instance field object in a field in the first object, wherein the pointer to the next instance field object is null when there are no more instance field objects in a linked list of the first object;

an owner field including a pointer to an owning object of the first instance field objects, wherein the owner of the first instance field object is the first object; and the second instance field object comprises:

an inverse field identifier field holding an identification of a field in the first type, wherein the identified field is the field in the first object that holds the first instance field object;

a next instance field object field including a pointer to a next instance field object in a field in the second object, wherein the pointer to the next instance field object is null when there are no more instance field objects in a linked list of the second object;

an owner field including a pointer to an owning object of the second instance field object, wherein the owner of the second instance field object is the second object.

16. The method of claim 15, wherein identification of a field in a second type comprises a string whose value is the name of the field in the second object that holds the second instance field object, and wherein the identification of a field in the first type comprises a string whose value is the name of the field in the first object that holds the first instance field object.

17. The method of claim 10, wherein the instance field objects whose values are references for which inverses are managed held in the one or more instance fields that the first object comprises are linked together in a linked list, and wherein the instance field objects whose values are references for which inverses are managed held in the one or more instance fields that the second object comprises are linked together in a linked list.

18. In a computing environment, a method for managing relationships for which inverses are managed of objects, the method comprising:

accessing a first given number of first objects, wherein the first objects are instances of a first type that specializes a base class, the base class including functionality for linking inverse object references, wherein the first objects comprise one or more instance fields, the one or more instance fields holding objects being linked together in a linked list, the one or more instance field objects each including a first instance field object which is an object of a type which manages a plurality of references from any object of the base class to an object of the base class, wherein each of the first instance field objects comprises:

an inverse field identifier field holding an identification of a field in a second type specializing the base class, wherein the identified field is the field in a number of second objects that hold second instance field objects;

a next instance field object field including a pointer to a next instance field object in a field in the same first object, wherein the pointer to the next instance field object is null when there are no more instance field objects in the linked list of the same first object;

an owner field including a pointer to an owning object of the first instance field object, wherein the owner of the first instance field object is a given first object;

a values field holding zero or more pointers, each pointer pointing to another object or the pointer;

receiving user input setting the value fields in the first instance field objects to values pointing to a second given number of second objects, wherein the second objects are instances of a second type, the second type specializing the base class;

accessing the second objects, wherein the second object comprises one or more instance fields, the one or more instance fields holding objects being linked together in a linked list, the one or more instance field objects including second instance field objects which are objects of a type which manages a plurality of references from any object of the base class to another object of the base class, wherein each of the second instance field objects comprises:

an inverse field identifier field holding an identification of a field in the first type, wherein the identified field is the field in the first object that holds the first instance field object;

a next instance field object field including a pointer to a next instance field object in a field in the second object, wherein the pointer to the next instance field object is null when there are no more instance field objects in a linked list of a given second object;

an owner field including a pointer to an owning object of the second instance field object, wherein the owner of the second instance field object is a given second object         a values field holding zero or more pointers, each pointer pointing to another object or the pointer;

automatically, without user input, and as a result of adding a pointer to a second object into the values field in the first instance field object, adding a pointer to the first object into the values field in a second instance field object, wherein the second instance field object is in the field identified by the inverse field identifier in the first instance field object; and     thereby linking the first instance field objects to the second instance field objects as inverses of one another.

19. The method of claim 18, further comprising accessing one or more of the first instance field objects to reveal the second objects.

20. The method of claim 18, further comprising accessing one or more of the second instance field objects to reveal the first objects.

* * * * *